March 19, 1940.　　　L. M. SIMPSON　　　2,194,057
SIGNALING SYSTEM
Filed Aug. 27, 1937　　　7 Sheets-Sheet 1

INVENTOR
LANCELOT MARTIN SIMPSON
ATTY.

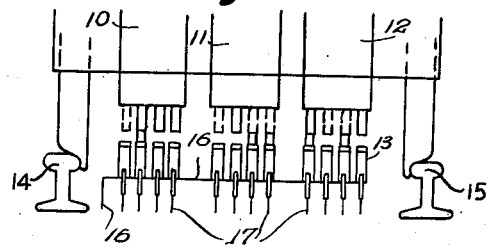
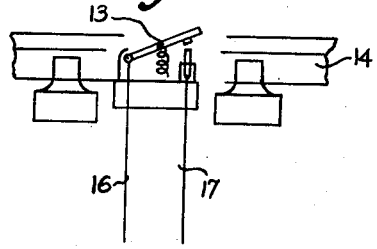
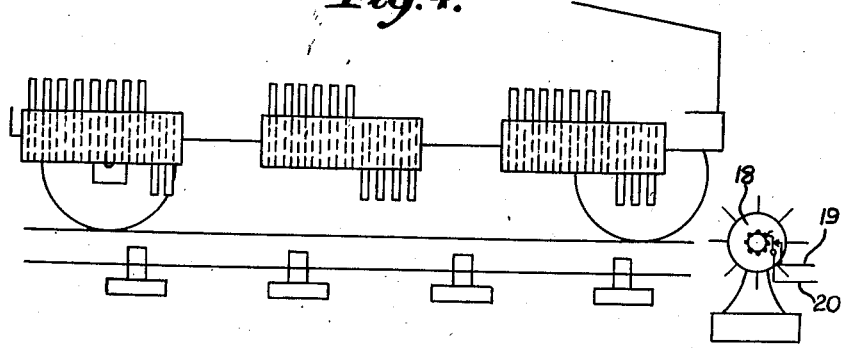

March 19, 1940.　　　L. M. SIMPSON　　　2,194,057
SIGNALING SYSTEM
Filed Aug. 27, 1937　　　7 Sheets-Sheet 3

INVENTOR
LANCELOT MARTIN SIMPSON
ATTY.

Fig. 9.
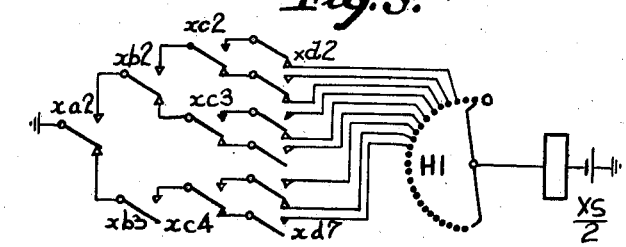
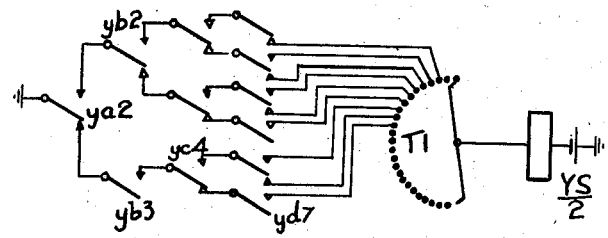
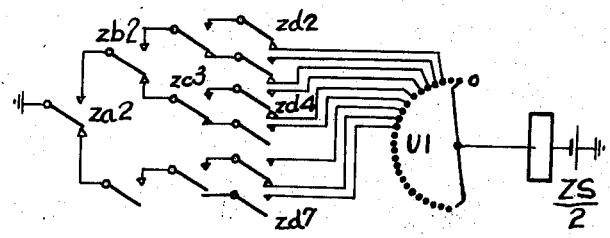
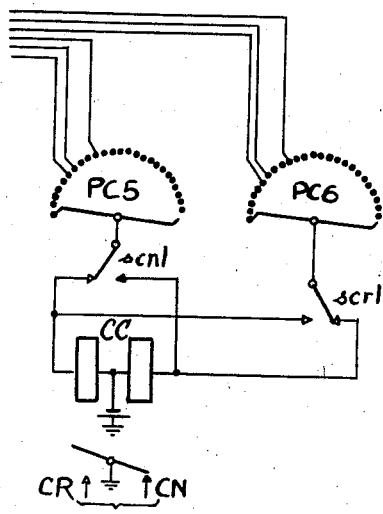

March 19, 1940.  L. M. SIMPSON  2,194,057
SIGNALING SYSTEM
Filed Aug. 27, 1937  7 Sheets-Sheet 7

INVENTOR
LANCELOT MARTIN SIMPSON

ATTY.

Patented Mar. 19, 1940

2,194,057

UNITED STATES PATENT OFFICE 2,194,057

SIGNALING SYSTEM

Lancelot Martin Simpson, Thorner, near Leeds, England, assignor to Automatic Telephone & Electric Company, Limited, London, England, a British company Application August 27, 1937, Serial No. 161,191
In Great Britain August 28, 1936

24 Claims. (Cl. 104—26)

The present invention relates to control and/or signaling systems for use on railways or like systems for the transport of goods and/or passengers and is more particularly concerned with systems intended to operate with driverless trains or carriers over a track network involving a large number of junctions. Such a system will find most advantageous employment for the carriage of goods rather than passengers and for it to attain its maximum economy and usefulness it would need to be underground since the cost of land would be prohibitive in a large city where it could be employed to best advantage.

To obtain full flexibility and maximum traffic-carrying efficiency in such a system tracks carrying traffic in conflicting directions are intended to never intersect but to cross above or below one another, and this involves alterations in the level of the various tracks which it would be impracticable to carry out above ground. It is intended that at each station where goods may be delivered or despatched the track in each direction would be provided with a loop or siding to which trains intended for that destination would be routed, through traffic passing on the direct line. At certain stations moreover it would be necessary to provide storage bays to which trains not at the time required in the system would be shunted. This withdrawal of trains from the track network could best be done manually under the control of the staff which must necessarily be provided at the station for loading and unloading purposes. At junction points where the tracks cross or diverge, track connections are made such that a train approaching the junction from one direction can be directed in any of the other possible directions without fouling any other track. This will of necessity involve a considerable amount of extra trackwork and tunnelling to enable the turns to be made satisfactorily.

The trains would most conveniently be electrically driven, and it is preferred that each upon entering a section would remove the power from the section through which it has just passed, thereby preventing any danger of collision from a train following. It is also contemplated that relay circuits would be associated with each junction to prevent any conflict between trains passing through the junction and to determine the order of priority of trains arriving simultaneously thereat; this, however, is not a part of the present invention.

It will be appreciated that in a system of this type where a train is to be controlled so as to cause it to move automatically from a station at one point on the network to a station on any other point, perhaps on the opposite side, and where a large number of intermediate junction points are involved, the signaling and controlling gear would need to be of considerable complexity and the manual control of a large system of this type from a central control room would prove an almost superhuman task.

The general object of this invention, therefore, is to provide trains and track with equipment so adapted to cooperate that trains will cause themselves to be routed automatically to any selected destination in a trackway system of any desired complexity. Where the network is extremely complicated, it is contemplated by the invention that a train may be directed over any one of a number of routes which serve equally well for bringing it to its destination, the particular route chosen being the one which is least congested at the time. It is also contemplated that a central control and indicating room would be provided from which it would be possible to follow the progress of any particular train in any part of the system and exercise some degree of control over its movements if desired.

Other objects will be made clear in the ensuing description of one method of carrying the invention into effect.

In the drawings:

Figs. 2 and 3 show, respectively, the destination characterizing equipment attached to each train and the trackway responding equipment;

Fig. 4 shows equipment which may be used alternatively to that shown in Figs. 2 and 3;

Figs. 8, 9 and 10 show more completely the switching control circuits as applied to the switching point shown in Fig. 11.

Figure 1:
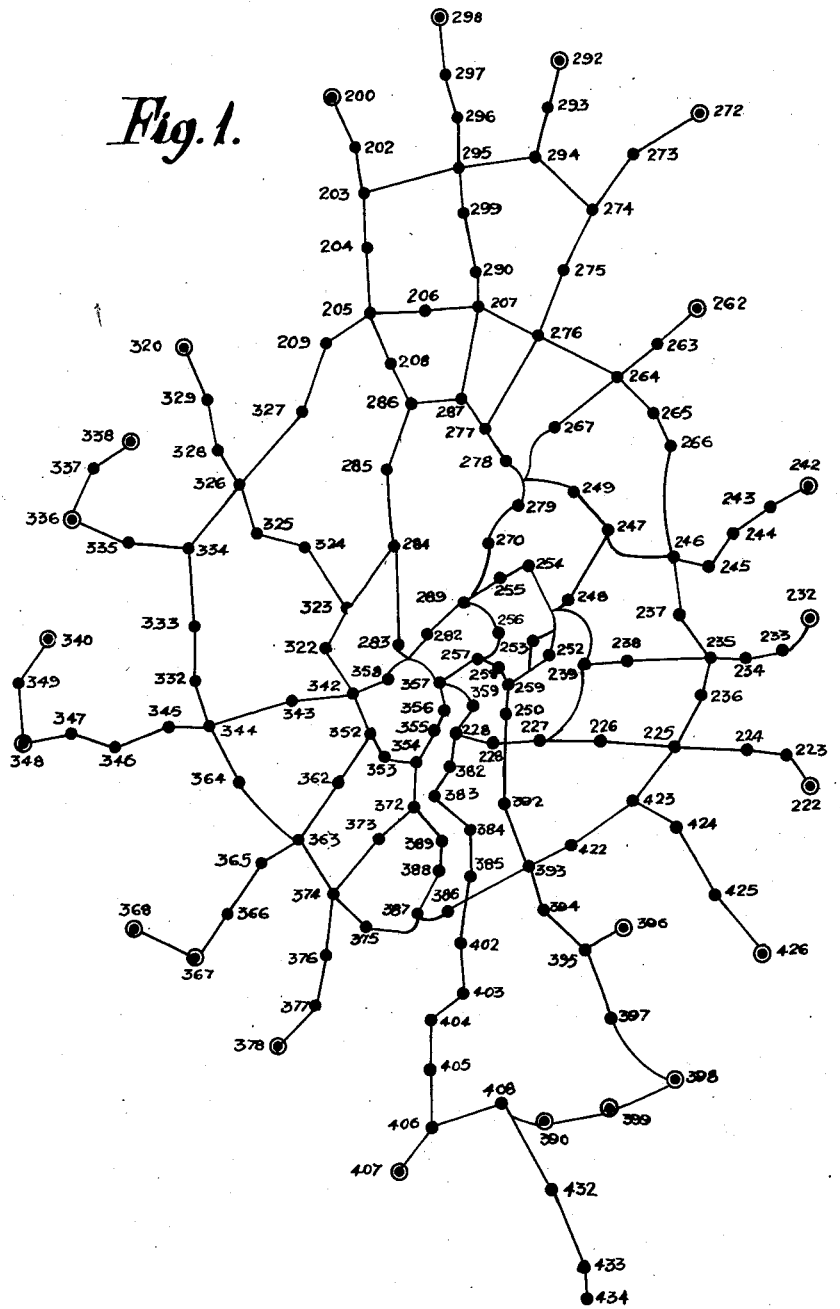
Fig. 1 shows a typical network of tracks interconnecting a plurality of stations.

In Fig. 1, underground stations are indicated by dots while surface stations, at which the trains might be loaded with goods incoming to the area, are indicated by a dot inside a circle. For convenience a three-digit numbering scheme has been chosen and, as will presently be explained in greater detail, the method of operation contemplated is that a train being despatched from any station, for instance station 200, and required to travel to station 368 would have the control members associated therewith set to 368 and would then be started on its way as soon as the track from terminal 200 was cleared. The characteristic setting 308 would then operate the equipment at each junction point or station to ensure that the train would be properly routed until it reached station 308 where it would be directed into the reception siding. Each of the stations is identified by a number arbitrarily assigned thereto.

Referring now to Figs. 2 and 3 these show the train and track equipment utilised in one arrangement for setting up the destination of the train. In this arrangement three sets of plungers 10, 11 and 12 are provided on the train, one set corresponding to each digit and each set consisting of four plungers any one or more of which may be lowered so as to make contact with spring detectors 13 located in their path between the track rails 14 and 15. Twelve detectors would thus be provided as shown in Fig. 2, and the depression of the appropriate detectors would complete circuits to extend potential from the common lead 16 over the individual leads 17 to operate control equipment in a manner to be described later. Fig. 2 also shows the plungers carried by a train approaching the detectors from a point behind same; certain of the plungers are lowered, and it will be understood that the corresponding detectors will be depressed thereby when the train passes over the detectors. The combination of plungers which must be lowered for the various digits of any code will subsequently be made apparent in connection with the description of the control equipment operated over the leads 17. In the modified arrangement shown in Fig. 4 similar plunger bars are provided but in this case they are arranged longitudinally along the train instead of transversely across and ten are provided for each routing digit. In this case the plungers which have been depressed engage with a spoked wheel 18 which is thereby turned through a definite angle and transmits a series of impulses over conductors 19 and 20, the number of impulses corresponding to the number of plungers which are depressed. The train in Fig. 4 is shown set for the code 342. In either case the plungers would be operated from control members conveniently located on the train.

Figure 5:
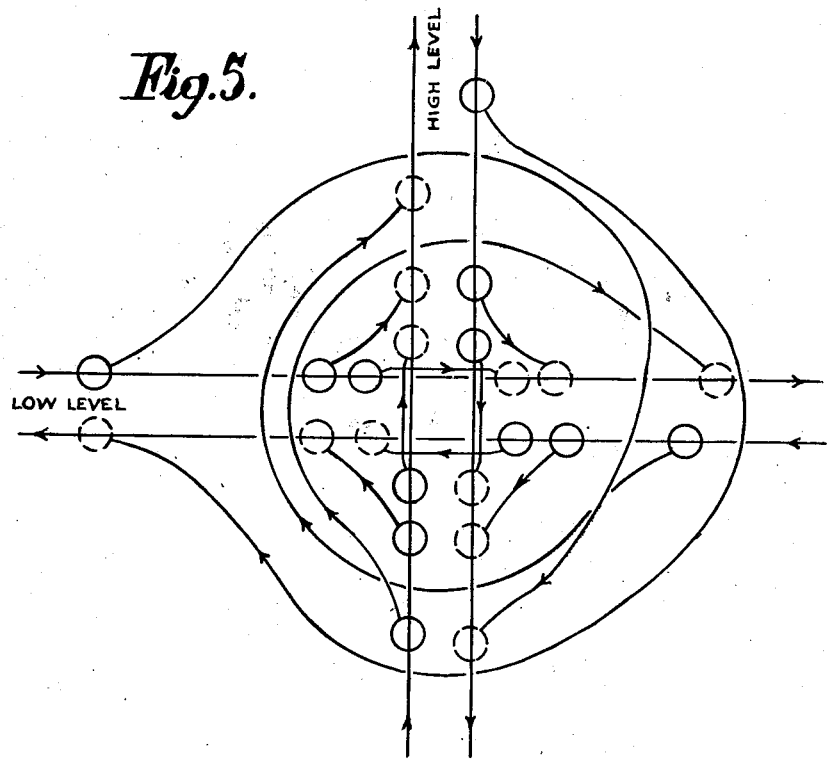
Figs. 5 and 6 show schematically two crossover layouts for use at switching points.

Fig. 5 indicates the various sets of switching points required at a crossing to give complete availability so that a train approaching a crossing from any direction may turn either to the right or left, may continue straight ahead or may be directed into the siding. The east-west line is assumed to be at a low level and the north-south line at a high level, and the manner in which the connections pass over and under is indicated in the figure. The various sets of switching points involved are also shown, leading or entering points being indicated by full circles and trailing points by dotted circles. It will be seen that twelve sets of entering points, i. e., points requiring external control to divert trains from the main track, and twelve sets of trailing points will be required for each such crossing.

Figure 6:
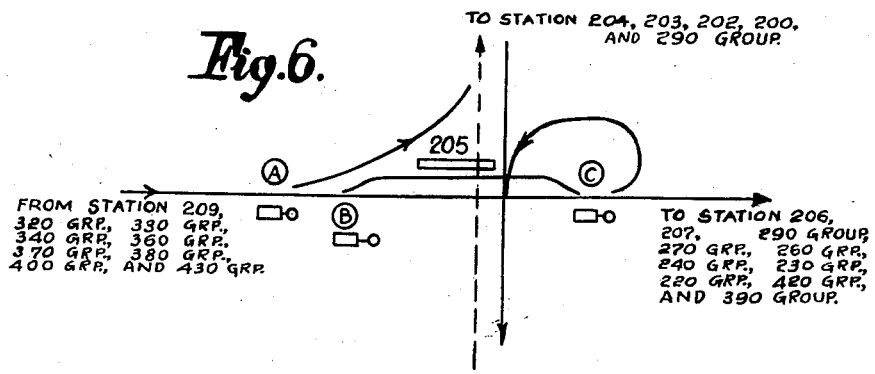

Fig. 6 shows in rather more detail the requirements in respect of switching points and turning tracks for the track coming from the west to station 205 and illustrates the principle on which the numbering scheme shown in Fig. 1 is based. Assuming that this track extends straight through when all the points A, B and C are normal, then the movement of each of these in turn to the reverse position will route a train coming from the west to the track running northwards, to the siding at station 205 and to the track running southwards respectively. It will be noted that Fig. 6 differs slightly from Fig. 5 in the arrangements provided for turning onto the southward track.

Figure 7:
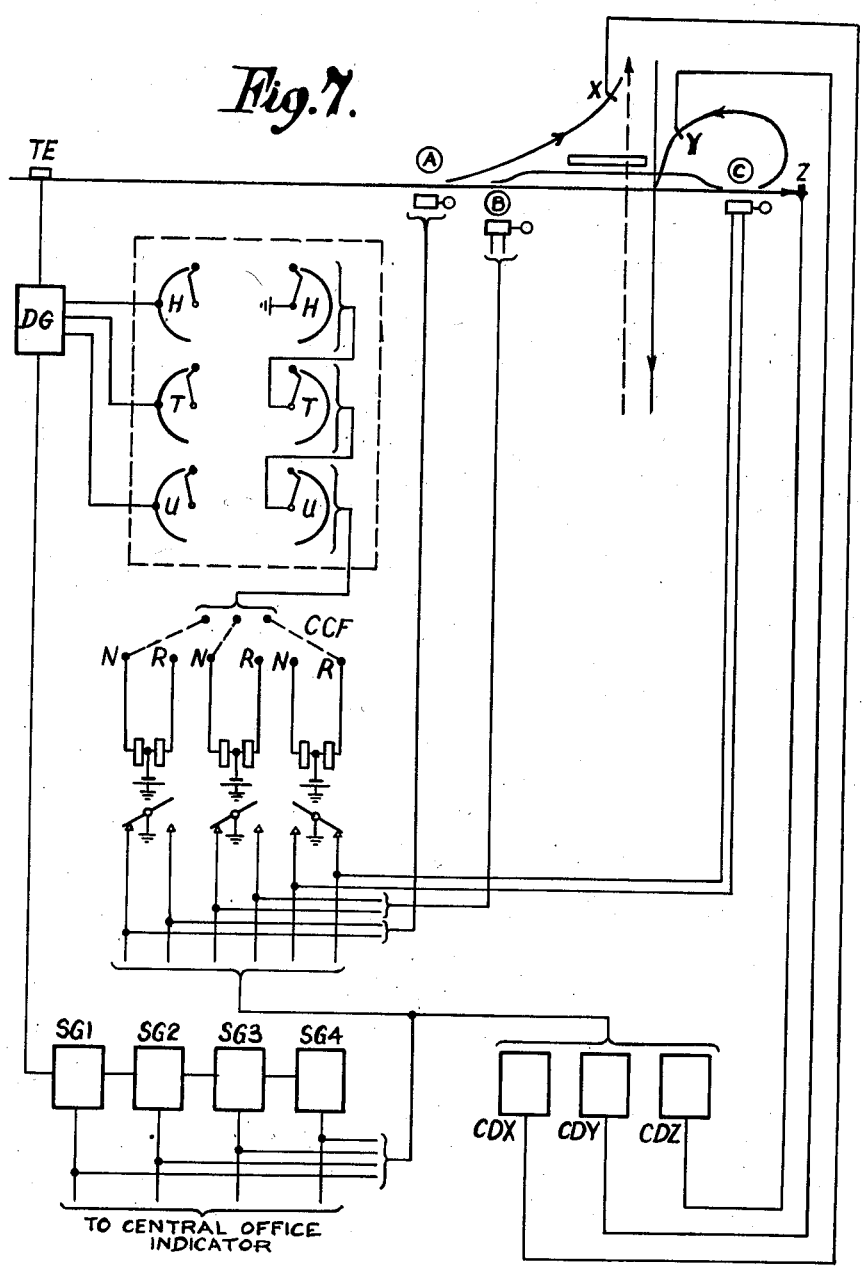
Fig. 7 shows a simplified diagram for the switching control circuits.

Fig. 7 indicates by means of a single line diagram the general layout of the control equipment which is required at each junction. As previously explained, a set of track equipment TE of the type shown in Fig. 3 or Fig. 4 is provided in the approach to each junction and by this means a code corresponding to the destination of the train is set up on the registering switches indicated in Fig. 7 to promote the proper track switching operation at the junction. If use is made of equipment of the type shown in Fig. 3 in which a digit having any value from 1 to 0 is set up by the connection of potential to four conductors in different combinations, a decoding group DG is necessary as shown and this will then mark suitable contacts in the banks of the registering switches H, T and U which receive respectively the hundreds, tens and units digits of the number characterizing the destination. These are preferably electromagnetically-operated step-by-step switches of the type used in telephone systems and hunt automatically by self-interruption of the driving circuit to set their wipers to a position corresponding to the code concerned. If the track equipment is of the type shown in Fig. 4, however, a decoding group would not be necessary since the switches may be directly stepped by the impulses. The switches also carry other wipers which complete connections via their respective banks and cross-connecting field CCF to three relays corresponding to the sets of switching points A, B and C which determine the route the train is to follow. These relays operate in accordance with the setting of switches H, T and U to complete circuits whereby the switching machines are set to normal or reverse as may be necessary and this operation is independent of the position they previously occupied which may have been the same. The cross-connecting field CCF is provided to facilitate re-arrangement of the codes or additions to the system at any time, and connections are made from the upper terminals to the lower terminals by means of jumpers which can be readily changed.

These arrangements serve for the automatic routing of the trains but it is also desirable that there shall be a central station at which an indication is given of the position of the various trains in the network at any time and this may be done by the use of principles already familiar in connection with so-called train describers. In the present instance it is assumed that the code number of the train would also be transmitted from the decoding group DG to the storage groups SG1—SG4 which would be so connected as to show on the indicator at the central control position the destination of the various trains passing a particular point.

For example, on the arrival of a train from the west which is bound for the south, the code characterizing the destination would be transmitted from the decoding group DG to the storage group SG4 and if there were no other codes in the storage groups SG1—3 it would be immediately transferred to group SG1. The code would then be transmitted, preferably in the form of trains of impulses, from the latter group to equipment at the central station indicator so that the destination code of the train could be shown thereon at this particular point while it could also be arranged that in accordance with the setting of the point control relays and extra digit would be transmitted to illuminate an arrowhead alongside the code indication which would indicate the direction of the routing. After transmission of the code into the storage group, the decoding group relays would be restored to normal in readiness for the reception of the next code, while the registering switches would be restored to the home position. Until the first train has cleared the points however, that is to say, it has either passed along the main line clear of the switching points A, B and C in turn or alternatively it has satisfactorily passed over a reversed set of points, no other train would be allowed to approach the detector TE and hence there would be no possibility of the points being altered by the arrival of a second train before the first train had cleared them.

It may be that a train which is to be routed northwards will clear the points A but will be unable to join the northbound track due to the incidence of traffic thereon and hence if another train arrives at detector TE during this time its code will be transmitted to storage group SG2 which will in turn transmit it to the central station and display it as the second arrival at this particular point. As many storage groups would be provided as thought necessary in view of the minimum spacing of the trains and of the time they are likely to be held up in the turning sections or the station.

A train in proceeding on its way, that is to say in travelling on to the north or southbound tracks or travelling eastwards away from the points G would be arranged to cancel its description at this particular point on the system, whereupon the stored descriptions at the same point of other trains behind it would be advanced in the storage groups. This could be done by the provision adjacent the various tracks of a treadle or the like indicated by X, Y and Z, one of which would be operated by the train according to its route and would signal the corresponding clear-down group CDX, CDY or CDZ. The circuit arrangements would be such that the description code of the train would then be cancelled in the particular group in which it stored and any stored descriptions behind it would then be moved up in the storages and their new positions therein signaled to the central indicator.

After leaving this junction the train would encounter the detector associated with the next junction and would cause its code to be shown at the corresponding position on the indicator in the manner described.

It might prove preferable to provide an illuminated diagram similar to Fig. 1 in which at each junction point the destination codes of up to say three trains situated thereat and the direction which they were to take would be displayed. As a train proceeded on its way from one junction to the next it could be arranged that its destination code remained showing at the junction it had just left until it reached the detectors associated with the next junction. Its code would then be cancelled at the earlier point and the codes of trains thereat which had arrived behind it would be moved up in the storages to fill up the place vacated while the code of the proceeding train would be displayed at the junction point which it was approaching.

Alternatively it could be arranged to indicate on a diagram of the above type the position of trains in the various track sections on the system by dark patches in known manner. The various sections so shown could also be numbered and on a separate indicator adjacent to each section number would be shown the destination of the train at the moment occupying that section while at a junction point the direction a train situated thereat was to take might also be shown by means of an illuminated arrowhead. This arrangement would possibly give the information in a more convenient form. In this case it would be necessary to provide track equipment and associated responding equipment at the entry to each train section and not only at the approach to a junction where a switching operation was required. It will be appreciated that in order to enable the tracks to be loaded as fully as possible the sections would be quite short, the actual length differing in accordance with factors such as gradient, curvature and proximity to junctions. The track equipment indicated in Fig. 7 might need to be located sufficiently far from the junction to permit a further train to pass it before the preceding one had cleared the junction and in this case storage equipment would need to be interposed between the decoding group and the registering switches to take care of the extra digits received until they could be utilised.

Figure 8:
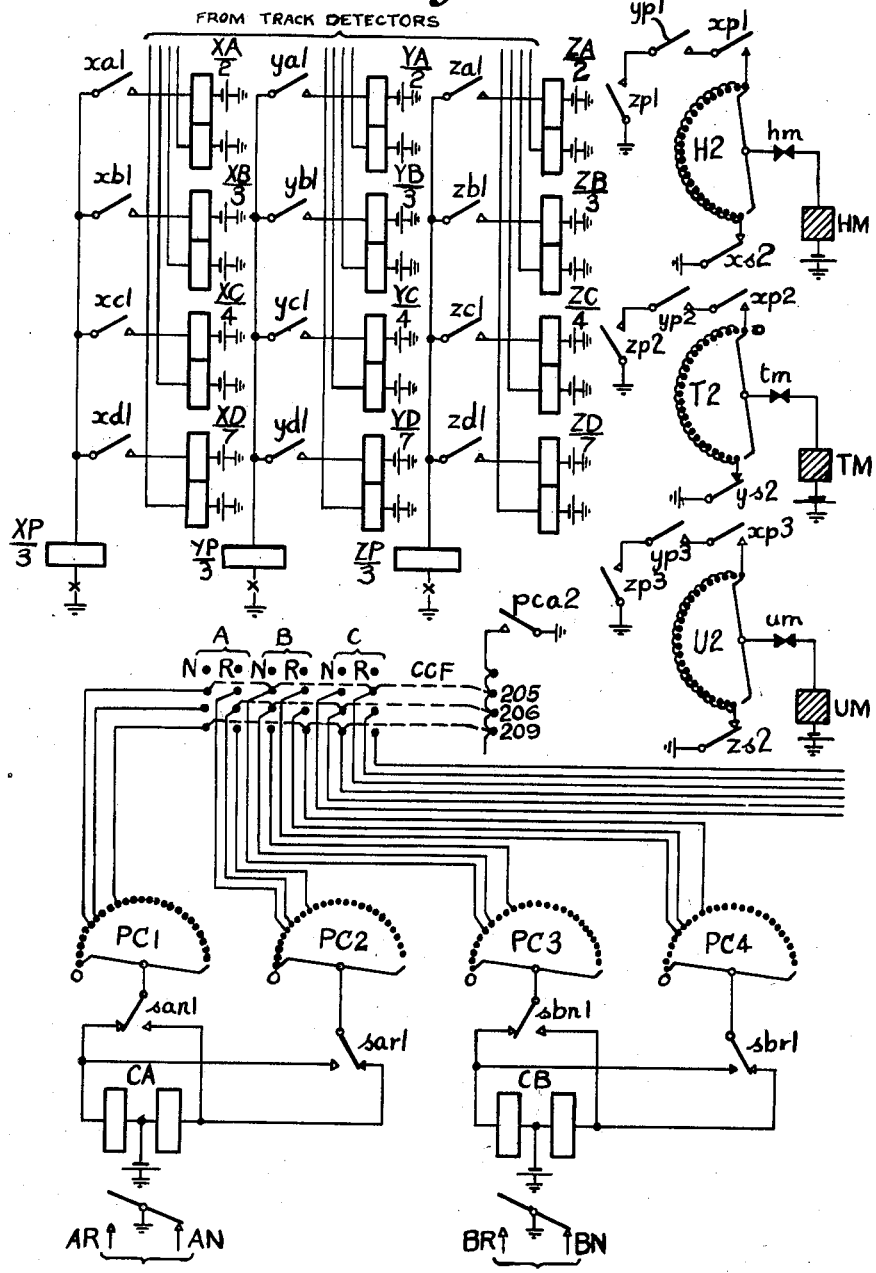
Figure 10:
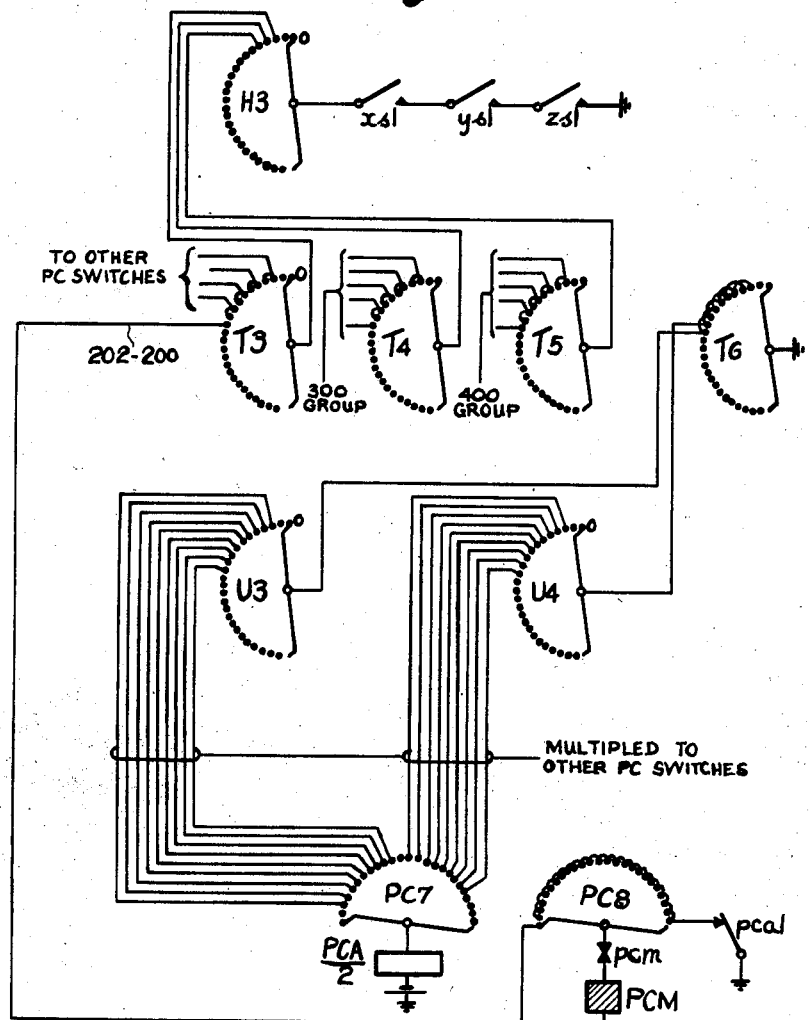
Figure 11:
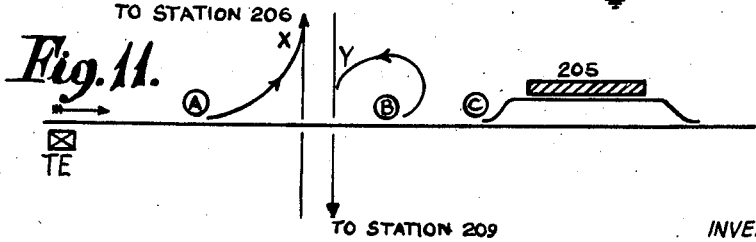

Referring now to Figs. 8–10 which show detailed circuits of the train routing arrangements of Fig. 7 and which are arranged to work in conjunction with track equipment of the type shown in Fig. 3 and the cross-over layout shown in Fig. 11, it will be seen that the typical cross-over layout assumed has been slightly modified from that of Fig. 6, the station 205 being positioned slightly away from the crossing in order to avoid the necessity of providing both low and high level platforms for the low level east and west and high level north and south traffic respectively. The B switching points in the reverse position will now route a train coming from the west on to the track running southwards, while the C switching points in the reverse position will route the train to the station 205.

When a train approaching from the west reaches the track equipment TE which is located at some distance from the crossing, it operates the detectors corresponding to the particular plungers lowered as has already been explained. This brings about the operation of a combination of the decoding relays XA—ZD over conductors extending from the track detectors (see Fig. 3). The four relays XA—XD are controlled by the corresponding four train carried plungers of the group 10 (Fig. 2) in accordance with the hundreds digit of the number identifying the train's destination, the relay group YA—YD is controlled by the plungers 11 in accordance with the tens digit and the relay group ZA—ZD is controlled by the plungers 12 in accordance with the units digit. It will be seen that armatures of each group of relays A—D are arranged in the well-known tree formation in order to mark one of the three digits of the destination identifying number in the corresponding one of the digit register switches H, T and U which register respectively the hundreds, tens and units digits. The actual marking of a digit in one of the switches is effected, of course, by the operation of relays A—D in various combinations to cause earth potential to be applied to the appropriate switch contact (second contact for digit 2, third contact for digit 3, etc.) as shown in the following table:

| Relays operated | Contact earthed | Relays operated | Contact earthed | Relays operated | Contact earthed |
|---|---|---|---|---|---|
| ABC | 2 | ACD | 5 | BCD | 8 |
| ABD | 3 | AC | 6 | BC | 9 |
| AB | 4 | AD | 7 | BD | 0 |

The digit 1 has been omitted throughout the numbering scheme since in the transmission of trains of impulses which might be utilised to send the codes from the storages through to the central office, it is generally desirable to avoid the use of a signal comprising a single impulse.

It will be assumed for purposes of illustration that it is desired that the train approaching the crossing of Fig. 11 be routed to station 205. Accordingly the plungers carried by this train will be lowered in combination to cause only relays XA, XB and XC, YB and YD and ZA, ZC and ZD to be energized thereupon operating contacts $xa$, $xb$ and $xc$, $yb$ and $yd$, and $za$, $zc$ and $zd$. The X relays upon operating mark the second contact in the hundreds registering switch bank H1 by an earth potential extended over armatures $xa2$ operated, $xb2$ operated, $xc2$ operated and $xd2$ unoperated, whilst the Y relays mark the tenth contact in the tens switch bank T1 over contacts $ya2$ unoperated, $yb3$ operated, $yc4$ unoperated, and $yd7$ operated, and the Z relays mark the fifth contact in the units switch bank U1 over contacts $za2$ operated, $zb2$ unoperated, $zc3$ operated, and $zd4$ operated. The X, Y and Z decoding relays also lock over their upper windings in series respectively with relays XP, YP and ZP which energize and together complete energising circuits by means of contacts $xp$, $yp$ and $zp$ for the switch magnets HM, TM and UM over obvious circuits including the wipers of the respective switches resting in their zero positions and the respective interrupter contacts $hm$, $tm$ and $um$. The magnets upon energising open these interrupter contacts and break their own circuits; thereupon they deenergize and restore their armatures so that the wipers are advanced to position 1 when self-interrupted driving circuits are completed over the commoned banks H2, T2 and U2. The wipers are accordingly rotated until they reach the marked contacts when earth extended over the H1, T1 and U1 wipers causes relays XS, YS and ZS to operate quickly and open the respective magnet driving circuits at $xs2$, $ys2$, and $zs2$ and arrest the motion. The H wipers will now be set on contact 2, and T wipers on contact 10 and the U wipers on contact 5 thereby registering the code of the required destination of the train.

It will be seen from Fig. 10 that only contacts 2, 3 and 4 of the hundreds switch are connected up and that, therefore, only three banks T3, T4 and T5 of the tens switch are required to cater for codes having the hundreds digits 2, 3 and 4 respectively. Additional contacts on the hundreds switch would be connected up, each to another bank of the tens switch to cater for extensions to the systems which would necessitate the use of codes having a hundreds digit 5, 6 and so on. Owing to the omission of digit 1 from the numbering scheme it will be appreciated that each of the various "hundreds" groups does not contain a hundred codes for there cannot be ten groups of ten codes each; instead there will be but nine "tens" groups (codes in a "tens" group will have the same hundreds digit and the same tens digit, but different units digits) each having but nine codes, so that there will be a total of eighty-one different codes available. It is arranged that five finder switches such as PC shall serve each hundreds group, each of four finders serving two "tens" groups or eighteen codes and the fifth serving one "tens" group or nine codes. In order to differentiate between the two "tens" groups served by any of the four finders serving two such groups an extra bank T6 is provided and functions in conjunction with the units switch banks and wipers U3 and U4 in a manner to be described. The finder serving whatever code is received controls relays CA, CB and CC in accordance with that code to effect the proper operation of the switching apparatus at points A, B and C of Fig. 11.

After the destination code 205 has been properly registered upon switches H, T and U as described, it will be seen that the operation of armatures $xs1$, $ys1$, and $zs1$ upon the energization of relays XS, YS and ZS extends earth over the H3 wiper in position 2 and the T3 wiper in position 10 to energise the magnet PCM of the finder switch PC over the PC8 wiper in its zero position, while earth will have already been extended over the T6 wiper in position 10 and the U3 wiper in position 5 to mark the contact 5 in the finder switch bank PC7. This finder switch is the particular one which serves codes 202, 203, 204, 205, 206, 207, 208, 209 and 200, while, as shown by Fig. 10, other finder switches would be started up by the reception of any other code since switches H and/or T would have been set in different positions. The magnet PCM upon energising breaks the circuit at its interrupter contacts $pcm$ and thereupon deenergizes to step its wipers to position 1 when a self-interrupted driving circuit is completed over wiper and bank PC8 to earth via armature $pca1$. Accordingly the wipers are rotated until wiper PC7 reaches the marked contact 5 when relay PCA quickly operates over a circuit including wiper PC7 in position 5, wiper U3 in position 5, and wiper P6 in position 10, opens the driving circuit of magnet PCM at armature $pca1$, and at armature $pca2$ connects an earth to the terminals on the cross-connection field allocated to the codes served by this finder switch. For the sake of simplicity of the drawings the terminals 205, 206 and 209 which relate to the cross-over layout shown in Fig. 11 are the only ones which have been shown.

If the code received by the equipment had been for example 272, earth would have been extended over the T3 wiper in position 7 to start up a finder switch serving the codes 262 up to 260 and 272 up to 270. This switch would then rotate to position 12 which would be marked over the U4 wiper in position 2 and the T6 wiper in position 7 and the operation would then have continued in the manner described except that the points would be controlled in accordance with the code 272.

The corresponding wipers of the fifteen finder switches would be multiplied together so that the right and left-hand windings of relay CA could be controlled over the PC1 and the PC2 wipers, respectively, of any switch; similarly, the CB relay would be controllable over the PC3 and PC4 wipers of any switch, and the CC relay would be controllable over the PC5 and PC6 wipers of any switch. Relays CA, CB and CC would in turn control the switching apparatus at points A, B and C, respectively, over conductors AR, AN, BR, BN, CR and CN, to thereby cause the individual switching points to be either at normal to allow a train to pass along a main track or to be in reverse position to cause the train to be diverted from the main track, depending upon whether the right or the left-hand winding of the corresponding relay is energized. From the layout diagram Fig. 11, it will be seen that with the A and B points normal and the C points reversed, a train from the west will be directed to station 205. Accordingly jumper connections are effected at the cross connection frame from terminal 205 to the terminals connecting with the fifth contacts on the banks PC1, PC3 and PC6. As the finder switch having access to this code has positioned its wipers on contacts 5 earth will be extended over these banks and wipers to energise the left-hand windings of the control relays CA and CB which thereupon maintain their armature in the position shown in the drawings so that the A and B points remain at normal whilst the right-hand winding of relay CC is energised and this relay operates its armature so that the C points are set to the reverse position.

The above described operation will occur well within the time the train takes to travel from the detector to the junction and the points will thus be automatically set in readiness for the passage of the train thereover.

When the train clears the junction it is arranged to operate a treadle or the like to open the earth feed to the holding circuits of relays XP, YP and ZP at the points indicated by the crosses adjacent to those relays in Fig. 8. Thereupon relays XP, YP and ZP and any of the decoding relays XA—ZD which were held operated in series therewith are released. By the release of the decoding relays the earth markings upon switches H1, T1 and U1 are removed, causing relays XS, YS and ZS to release. Armatures $xs2$, $ys2$, and $zs2$, upon restoring to normal close identical circuits to magnets HM, TM and UM, the first of which, for example, includes battery, magnet HM, self-operated contacts $hm$ of that magnet, wiper H2 in position 2, contact $xs2$ and earth. These magnets thereupon operate self-interruptedly until the wipers H2, T2, and U2 are rotated to their zero (home) positions where, because contacts $zp$, $yp$ and $xp$ have been opened, there is no earth potential to reoperate the magnets.

As soon as the homing operation of switch U is initiated the circuit for relay PCA, which included wipers PC7 and U3 in position 5, and wiper T6 in position 10, is broken; the closure of contact $pca1$ completes a circuit including wiper PC8 and interrupter contacts $pcm$ to initiate the homing movement of finder switch PC. Magnet PCM operates self-interruptedly in this circuit until the switch reaches the zero position where it is brought to rest because the previous opening of contacts $xs1$, $ys1$, and $zs1$ has removed the earth potential from the home contact of bank PC8. The registering and finder switches are thus restored to normal in readiness for reception of the next code.

The automatic routing of trains approaching from the west and the destinations of which are stations 206 and 209 will be appreciated from further examination of the drawings.

In connection with the central station indicating arrangements, the decoding relays XA—ZD could be connected up to storage groups SG1—SG4 as in Fig. 7 but it could be arranged alternatively to provide an extra bank and wiper on each of the switches H, T and U which could extend markings in accordance with the position of their wipers to an impulse sending arrangement. This would thereupon transmit to relevant storage equipment at the central office trains of pulses indicative of the code received while a further train could follow which would indicate the resultant setting of the points. The location of the storage equipment at the central office would be generally preferable since they could be simply interlinked to provide an overlap of the indications as trains proceeded from one junction to another.

With an indicating arrangement comprising an illuminated diagram similar to Fig. 1 the control operated would have complete supervision of the system and would be able to appreciate whether there was any danger of congestion occurring, and if so, at what points. It could be arranged that from the central control room the route taken by any train could be influenced so as to relieve the routes which appeared to be most congested. From reference to Fig. 8 it will be seen that by the operation of the armatures $san1$ and $sar1$ would bring the left and right-hand windings of relay CA under the influence of wipers PC2 and PC1, respectively, whereas they are normally under the influence of wipers PC1 and PC2, respectively, to thereby cause the switching action which would normally occur at point A upon the approach of a train to be reversed. Similarly, the normal automatic operation at switching point B would be reversed by operation of armatures $sbn1$ and $sbr1$, while that at point C would be reversed by operation of armatures $scn1$ and $scr1$. It is contemplated that these armatures would be operable responsive to the energization of relays which could be controlled from the central station to thereby provide the desired manual control over the switching operations. Alternatively the presence of the trains themselves in such proximity to a particular point as to cause congestion might automatically effect changes in the routing for instance by means of changeover contacts adjacent to the cross-connecting field whereby the normal route was altered so as to reduce congestion to a minimum.

It will be appreciated that if a train should be deflected from its normal route either by design or inadvertence it would still be in a position to reach its destination without any change being necessary to allow for the altered routing.

I claim:

1. In a railway system, a track and a vehicle running thereover, a rotary device having spokes extending therefrom associated with the track, a series of members on said vehicle mounted parallel to the direction of movement of the vehicle and adapted to be extended therefrom in any of a plurality of combinations to engage spokes of said device as the train runs over said track thereby to variably rotate said device, an electrical circuit, and an impulsing contact operated by said device during rotation to transmit current impulses over said circuit.

2. In a railway system, a track for guiding moving vehicles, a switching point in said track from which vehicles may be guided in any of a plurality of directions, a plurality of destinations accessible via each direction, a characterizing number arbitrarily assigned to each destination, a vehicle moving toward said switching point, a selector carried by said vehicle set to correspond to the number assigned to any desired one of said destinations, a register, means associated with the track and operated by said selector in accordance with the setting thereof as said vehicle approaches said switching point, said last means controlling said register in accordance with the setting of said selector to cause said number to be registered therein, switching means associated with said point, and means controlled by said register to operate said switching means to cause said vehicle to be guided from said point in the direction giving access to said destination.

3. A railway system as claimed in claim 2, wherein the characterizing number arbitrarily assigned to each of said destinations comprises a plurality of digits.

4. In a railway system, a switching junction comprising an entering track with a plurality of exit tracks accessible thereto, a destination accessible over certain ones of said exit tracks, a characterization arbitrarily assigned to said destination, a vehicle approaching said junction over said entering track, means on said vehicle characterizing said vehicle in accordance with said characterization assigned to said destination, means associated with said entering track and operated by the means on said vehicle in accordance with the characterization thereof as said vehicle approaches said junction, switching apparatus at said junction normally controlled by said last means responsive to said operation of said last means to guide said vehicle from said junction via a predetermined one of said certain exits, and means operated at will to cause said switching apparatus to guide said vehicle from said junction via a different one of said certain exits responsive to said operation of said last means.

5. An automatic conveying system in which the movement of conveyances is observed at a central position, comprising a track network upon which conveyances are adapted to move, switching junctions in said network from which conveyances may be guided in any of a plurality of directions, switching apparatus at each of said junctions, a conveyance carrying control means set in any of a plurality of ways, and means individual to each of the junctions encountered by said conveyance and operated by the control means as said conveyance moves toward said junction both to signal the central position and to control the switching apparatus at the junction to guide the conveyance from said junction in a direction depending upon the way in which said control means is set.

6. In a railway system, a track, a rotatable member on said track, a train, means on said train set selectively in any of a plurality of ways, said means effective, as the train travels over said track, to rotate the member through an angle dependent upon said setting, an electrical circuit, and a contact controlled by said member and transmitting over said circuit a series of current impulses dependent in number upon the angle through which said member is rotated.

7. In a railway system, a track, a movable member at a certain point on said track, a vehicle approaching said point over the track, means on said vehicle set in any of a plurality of manners, said means engaging with said member as the vehicle passes said point and moving said member an amount depending upon the setting of said means, and an electrical impulse generating device operated by said member to transmit electrical impulses comprising a code corresponding to the amount of movement of said member.

8. In a railway system, a plurality of dispatching stations, a plurality of receiving stations, a network of tracks interconnecting said stations, a plurality of switching points in said network each having thereat track switching apparatus, vehicles adapted to be dispatched from any of said dispatching stations and to travel over the tracks in a predetermined route from that station to any desired one of said receiving stations, means carried by each vehicle and set before the vehicle is dispatched to identify the receiving station to which it is desired that the vehicle shall travel, means on the track in the approach to each of said switching points cooperating with the vehicle carried means upon a vehicle approaching that point to transmit a series of spaced electrical impulses identifying the receiving station to which it is desired that the vehicle shall travel, and means associated with that point and responsive to said impulses for controlling the switching apparatus thereat to direct said vehicle from said point over the tracks in said predetermined route to the desired receiving station.

9. In a system for routing vehicles, a plurality of stations, a characterization arbitrarily preassigned to each of said stations to distinguish that station from the other stations, a network of vehicular paths interconnecting said stations, a vehicle leaving any one of said stations, means on said vehicle characterizing said vehicle in accordance with the characterization preassigned to any other one of said stations to which it is desired that said vehicle travel, a plurality of path intersections in said network over one or more of which intersections said vehicle must pass to reach said other station, a register associated with each of said intersections, means operated by the means on said vehicle to transmit to said register electrical impulses comprising a code corresponding to the characterization of said vehicle as said vehicle approaches that intersection, switching apparatus at the intersection, and means controlled by said register to operate said switching apparatus to direct said vehicle from said intersection over a predetermined path corresponding to that code.

10. In a system for routing conveyances, a switching junction, an incoming line over which conveyances may enter said junction, a plurality of outgoing lines over which conveyances may leave said junction, a plurality of stations accessible over each of said outgoing lines, an identifying number arbitrarily assigned to each of said stations to distinguish that station from the other stations, a conveyance entering said junction over said incoming line, means on said conveyance set in accordance with the number identifying that one of said stations to which it is desired that said conveyance shall be directed, means individual to said junction and controlled by the setting of the means on said conveyance to register the number of the station to which it is desired that said conveyance be directed, junction switching apparatus, and means controlled by said last means for controlling said apparatus in accordance with the registered number to cause said vehicle to be directed from said junction over that outgoing line over which said desired station is accessible.

11. In a railway system, a track, control apparatus, a vehicle, means on said vehicle characterizing said vehicle in any of a plurality of different ways, means controlled by said last means for transmitting to said apparatus, responsive to said vehicle passing a particular point in said track, electrical impulses comprising a code corresponding to the characterization of said vehicle, different characterizations of said vehicle hence causing different codes to be transmitted, a switch at a point in said track encountered by said vehicle after passing said particular point, means in said control apparatus for operating said switch responsive to the receipt of only certain predetermined ones of said different codes, said switch effective, when operated, to divert the vehicle from said track.

12. In a railway system, a track, control apparatus, a vehicle, means on said vehicle characterizing said vehicle in any of a plurality of different ways, means controlled by said last means for transmitting to said apparatus, responsive to said vehicle passing a particular point in said track, electrical impulses comprising a code corresponding to the characterization of said vehicle, different characterizations of said vehicle hence causing different codes to be transmitted, a plurality of switches in a section of said track encountered by said vehicle after passing said particular point, means in said control apparatus for operating each of said switches responsive to the receipt of a certain predetermined one or more of said different codes, each switch effective, when operated, to divert the vehicle from said track.

13. In a railway system, a track, a plurality of independently rotatable members, a vehicle, a plurality of devices on the vehicle each corresponding to one of said members, each of said devices set independently in any of a plurality of different ways and effective to rotate the corresponding member responsive to said vehicle travelling over a particular point in said track, the amount of rotation of each member depending upon the way in which the corresponding device is set whereby different settings of any device cause the corresponding member to be rotated different amounts, a switching junction in said track encountered by said vehicle after passing said particular point, track switching apparatus at said junction, and means controlled conjointly by all of said members for operating said track switching apparatus in accordance with the amount of rotation of the respective members to guide said vehicle from said junction in a certain direction.

14. In a railway system, a track, a rotatable member, a vehicle, means on said vehicle for rotating said member, said means set in any of a plurality of different ways and effective, when said vehicle passes over a particular point in said track, to rotate said member an amount depending upon the way in which said means is set, different settings of said means hence causing said member to be rotated different amounts, a switching junction in said track encountered by said vehicle after passing said particular point, track switching apparatus at said junction, and means controlled by said member for operating said track switching apparatus in accordance with the amount of rotation of said member to guide said vehicle from said junction in a certain direction.

15. In a railway system, a track, a rotatable member, a vehicle, means on said vehicle for rotating said member, said means set in any of a plurality of different ways and effective, when said vehicle passes over a particular point in said track, to rotate said member an amount depending upon the way in which said means is set, different settings of said means hence causing said member to be rotated different amounts, a plurality of switches in a section of said track encountered by said vehicle after passing said particular point, each of said switches being operable to divert said vehicle from said track, and means for operating the different ones of said switches responsive to different amounts of rotation of said member.

16. In a railway system, a through track, a junction having a plurality of side tracks branching from said through track, a plurality of switches each individual to one of said side tracks and operable to divert vehicles to that side track from said through track, a vehicle approaching said junction over said through track, a selector on said vehicle set in accordance with the route through said junction that it is desired that said vehicle follow, a detector on said through track responsive to the setting of said selector as said vehicle approaches said junction, and means operated by said detector for positioning all of said switches at once in accordance with the setting of said selector thereby to route said vehicle through said junction over said desired route.

17. In a railway system, a track, a section of said track containing a plurality of switches each operable to divert vehicles from said track, a plurality of destinations accessible over each of certain of said switches, a single destination accessible over each of the remaining switches, a number arbitrarily assigned to each of said destinations to distinguish that destination from the others of said destinations, vehicles approaching said track section over said track at different times intended for different ones of said destinations, a selector on each of said vehicles set in accordance with the number assigned to the intended destination of that vehicle, means controlled by the selector on each vehicle approaching said section to register the number assigned to said intended destination of that vehicle, and means controlled by said last means for operating each of said switches responsive to the registration of the number assigned to any destination accessible over that switch.

18. In a railway system, a track, a section of said track containing a plurality of switches each operable to divert vehicles from said track, a plurality of destinations accessible over each of said switches, a number arbitrarily assigned to each of said destinations to distinguish that destination from the others of said destinations, vehicles approaching said track section over said track at different times intended for different ones of said destinations, a selector on each of said vehicles set in accordance with the number assigned to the intended destination of that vehicle, means controlled by the selector on each vehicle approaching said section to register the number assigned to said intended destination of that vehicle, and means controlled by said last means for operating each of said switches responsive to the registration of the number assigned to any destination accessible over that switch.

19. In a system for routing conveyances, a primary path, a plurality of secondary paths, a section of said primary path containing a plurality of switches each operable to divert moving conveyances from said primary path to one of said secondary paths, a plurality of destinations accessible over each of certain of said secondary paths, a single destination accessible over each of the remaining secondary paths, a characterization arbitrarily assigned to each of said destinations to distinguish that destination from the others of said destinations, conveyances travelling over said primary path toward said section at different times intended for different ones of said destinations, means on each of said conveyances characterizing said conveyance according to the characterization assigned to its intended destination, means controlled by the means on each conveyance approaching said section to register the characterization assigned to the intended destination of that conveyance, and means controlled by said last means for operating each of said switches responsive to the registration of the characterization assigned to any destination accessible over the secondary path to which that switch may divert conveyances.

20. An automatic conveying system in which the movement of conveyances is observed at a central position, comprising a network of paths over which conveyances may travel, a plurality of path intersections in said network, switching apparatus at each of said intersections, a conveyance carrying control means set in any of a plurality of ways, means associated with each intersection and operated by said control means as said conveyance approaches said intersection to control the switching apparatus at that intersection to guide said conveyance from said intersection in a direction depending upon the way in which said control means is set, and means operated at will from the central position to cause said last means associated with any desired intersection to control the switching apparatus at that intersection to guide said conveyance from said intersection in a direction different from said last direction.

21. In a system for routing vehicles, two stations, a network of vehicular paths interconnecting said stations, a plurality of path intersections in said network each having thereat switching apparatus, a vehicle leaving said first station, a device on said vehicle, means individual to each intersection encountered by said vehicle operated by said device as said vehicle approaches that intersection, said means individual to each intersection normally effective, responsive to said operation thereof by said device, to control the switching apparatus at that intersection to direct said vehicle from said intersection over a particular path, said particular path from each intersection being predetermined and causing said vehicle normally to travel to said second station over a particular route, means operated at will to cause the means individual to one of the intersections encountered by said vehicle to control the switching apparatus thereat to direct said vehicle from that intersecton over a path different from said particular path thereby to cause said vehicle to leave said route, said device operating the means individual to each intersection encountered thereafter by said vehicle to control the switching apparatus at that intersection to direct said vehicle from said intersection over a particular path therefrom, the path from each of said last intersections being predetermined and causing said vehicle to travel a different route to said second station.

22. In a railway system, a plurality of dispatching stations, a plurality of receiving stations, a network of tracks interconnecting said stations, a plurality of switching points in said network each having thereat track switching apparatus, vehicles adapted to be dispatched from any of said dispatching stations and to travel through the network over tracks from that station to any desired one of said receiving stations, a preferred route normally travelled by a vehicle from any dispatching station to any receiving station, one or more routes available to said vehicle alternatively to said preferred route, means on each vehicle set before the vehicle is dispatched to identify the receiving station to which it is desired that the vehicle shall travel, means operatively associated with each switching point encountered by said vehicle en route to its destination and controlled by the setting of the means on the vehicle to operate the track switching apparatus at that point to route the vehicle therefrom over said preferred route, and means operated at will to cause said last means, when operated by an approaching vehicle, to operate the switching apparatus at that point to route said vehicle therefrom over one of said alternative routes.

23. In a system for routing vehicles, two stations, a network of vehicular paths, said network containing a plurality of routes from the first station to the second station, one or more path intersections in each of said routes, switching apparatus at each intersection, a vehicle travelling over one of said routes to said second station, a device on said vehicle, means individual to each intersection encoutered by said vehicle operated by said device as said vehicle approaches that intersection, said means individual to each intersection normally effective, responsive to said operation thereof by said device, to control the switching apparatus at that intersection to maintain said vehicle on said one route through said intersection, means operated at will to cause the means individual to any one of said intersections encountered by said vehicle to control the switching apparatus at that intersection to direct said vehicle from that intersection over a path therefrom in another of said routes, said device thereafter operating the means individual to each intersection in said other route, as that intersection is encountered by said vehicle, to control the switching apparatus at that intersection to maintain said vehicle on said other route through said intersection.

24. In a system for routing vehicles, a dispatching station, a plurality of receiving stations, a network of vehicular paths, said network containing a plurality of routes from the dispatching station to each receiving station, one or more path intersections in each of said routes, vehicles dispatched at different times to the different ones of said receiving stations from said dispatching station, a selector on each of said vehicles set to identify the receiving station to which it is desired that that vehicle travel, the setting of the selector on each vehicle being the same for all routes to the receiving station to which it is desired that that vehicle travel, means individual to each intersection and operated by the selector on each vehicle approaching that intersection over one of said routes, said last means effective to control the switching apparatus at that intersection in accordance with the setting of the selector on that vehicle to maintain said vehicle on said one route through said intersection.

LANCELOT MARTIN SIMPSON.